United States Patent [19]

Lawson et al.

[11] Patent Number: 5,069,927
[45] Date of Patent: Dec. 3, 1991

[54] ADHESIVELY-BONDED COATED COMPOSITES OF HIGHLY SATURATED ELASTOMERS

[75] Inventors: David F. Lawson, Uniontown; Lynn A. Bryant, Canton, both of Ohio

[73] Assignee: Bridgestone/Firestone, Inc., Akron, Ohio

[21] Appl. No.: 657,353

[22] Filed: Feb. 15, 1991

Related U.S. Application Data

[63] Continuation of Ser. No. 318,267, Mar. 3, 1989, abandoned.

[51] Int. Cl.$^5$ ................................................ B05D 3/06
[52] U.S. Cl. ........................................ 427/40; 427/41; 428/413; 428/424.8; 428/519; 525/332.3; 525/358; 525/359.1; 525/359.2; 525/359.4
[58] Field of Search ................ 427/40, 41; 428/413, 428/424–428, 519; 525/332.3, 358, 359.1, 359.2, 359.4

[56] References Cited

U.S. PATENT DOCUMENTS

| | | | |
|---|---|---|---|
| 4,093,694 | 6/1978 | Browning | 264/246 |
| 4,158,378 | 6/1979 | Pearson et al. | 427/421 X |
| 4,500,685 | 2/1985 | Ogawa et al. | 525/343 |
| 4,613,517 | 9/1986 | Williams | 427/40 |
| 4,632,959 | 12/1986 | Nagano | 525/78 X |
| 4,945,016 | 7/1990 | Marachi | 524/81 |

FOREIGN PATENT DOCUMENTS 2006692 5/1979 United Kingdom .
2006693 5/1979 United Kingdom .

OTHER PUBLICATIONS

"Corona Discharge Activation and Reconstruction of Elastomer Surfaces", Reprinted from Rubber Chemistry and Technology, vol. 60, No. 1, Mar.-Apr., 1987.
"Electrical Characterization of a Corona Discharge for Surface Treatment", Reprinted from Transactions of Industry Applications, vol. Ia-11, No. 3, May/Jun., 1975.

Primary Examiner—Michael Lusignan
Attorney, Agent, or Firm—Daniel N. Hall

[57] ABSTRACT

A composite comprises a coating which is adhered to a highly saturated elastomer having a corona discharge activated surface which is chemically fixed by a halogenating agent. A coating such as a paint, a weather-resistant film, etc., or an adhesive layer, is adhered to the activated and fixed surface. Various halogenating agents include N-halohydantoins, N-haloimides, N-haloamides, aqueous chlorine or bromine solutions, and acidified hypochlorite solutions. The composite is useful for EPDM roofing and consumer goods, e.g., a flexible polyurethane paint applied to the sidewalls of tires, as a decorated article, bonded composites, and the like.

9 Claims, No Drawings

ADHESIVELY-BONDED COATED COMPOSITES OF HIGHLY SATURATED ELASTOMERS

FIELD OF THE INVENTION

The present invention relates to adhesively-bonded or coated composites of highly saturated elastomers wherein the highly saturated elastomer surface has been activated and chemically fixed by utilizing corona discharge and subsequently applying a halogenating agent.

BACKGROUND

Heretofore, it was generally known to adhere or coat unsaturated elastomers. Corona discharge has been used to activate the surfaces of polyolefin films for self-bonding and printing. However, it has not been known to adhere a coating to a highly saturated elastomer since such elastomers are resistant to bonding and to surface treatments for bonding.

U.S. Pat. No. 4,158,378 to Pearson et al relates to a cured rubber tire and a laminate of cured polyurethane and to a rubber surface preparation which includes treatment with chlorine water.

U.S. Pat. No. 4,500,685 to Ogawa et al relates to a process of modifying a vulcanized rubber surface utilizing a halogenating agent dispersed in a waxy substance wherein the halogenating agent includes halogenated isocyanuric acid and the like.

An article entitled "Corona Discharge Activation and Reconstruction of Elastomer Surfaces" in *Rubber Chemistry and Technology*, Volume 60, No. 1, March-April 1987, relates to exposing elastomers to corona discharge. EPDM exposed to corona discharge did not demonstrate increased adhesion strength.

SUMMARY OF THE INVENTION

It has been found that a coating, i.e. a paint, can be advantageously adhered to a highly saturated elastomer by activating the elastomer surface with corona discharge immediately followed by treatment with at least one coating of a halogenating agent. The elastomer surface is generally subjected to the corona discharge for an amount of time sufficient to add functionality to the surface of the elastomer to insure wetting and reaction therewith by the halogenating agent. The halogenating agent can include aqueous bromine or chlorine solutions, acidified hypochlorite solutions, halogenated N-halohydantoins, N-haloamides, and N-haloimides, and the like. After treatment, paint or adhesive coatings can be applied. A synergistic bond is achieved.

DETAILED DESCRIPTION OF THE INVENTION

The highly saturated elastomer substrate or layer of the present invention to which is bonded or adhered a coating can be any conventional highly saturated elastomer known to those skilled in the art and to the literature. That is, the amount of unsaturation is generally low and generally contains less than 20 mole percent and preferably less than 10 mole percent of carbon double and/or carbon triple bonds (ethylenic and/or acetylenic unsaturation). Conversely, "highly saturated" means that the polymers or copolymers are at least 80 mole percent and preferably at least 90 mole percent saturated. The substrate can be made from various elastomeric homopolymers, copolymers, terpolymers, and the like. For example, it can be made from hydrogenated or partially hydrogenated homopolymers of conjugated dienes or halogenated conjugated dienes having from 4 to 12 carbon atoms such as butadiene, pentadiene, isoprene, hexadiene, and the like, with generally butadiene and isoprene being preferred. Copolymers can be made from monomers of different conjugated dienes having from 4 to 12 carbon atoms such as those set forth above and then hydrogenated. Highly saturated elastomers can also be made by hydrogenation of copolymers made from conjugated dienes having from 4 to 12 carbon atoms, such as those set forth hereinabove, with a vinyl substituted aromatic monomer having from 8 to 12 carbon atoms with specific examples including styrene, alpha methyl styrene, diphenylethylene, and the like. Highly saturated polymers can also be obtained by polymerization of olefins such as isobutylene, ethylene, propylene, 1-butene, 1-octene, and the like. Highly saturated copolymers of the above can also be prepared with dienes such as butadiene, isoprene, 2-chloro-1,3-butadiene, piperylene, and the like. Examples of specific copolymers include chlorinated isobutylene-isoprene copolymer (CIIR), brominated isobutylene-isoprene copolymer (BIIR), and isobutylene-isoprene copolymer (IIR). Copolymers can also be made from various alkylene monomers having from 2 to about 10 carbon atoms with a specific example including ethylene-propylene copolymer (EPM). Terpolymers can be made from various alkylenes such as those having from 2 to about 10 carbon atoms with ethylene and propylene being preferred, in association with small amounts of a non-conjugated diene, such as 1,5-hexadiene, or ethylidene norbornene, etc. (i.e. less than 5–10 percent by weight). An example of a suitable and a preferred terpolymer of the present invention is ethylene-propylene-diene terpolymer (EPDM).

The various elastomers can be compounded in accordance with conventional practices using conventional additives and amounts known to those skilled in the art and to the literature including fillers such as carbon black, silica, and various clays, various antioxidants, various curing agents such as sulfur peroxides, various accelerators, various oils, various pigments, and the like.

Generally, the surface of the elastomer is cleaned in any conventional manner or process as by an organic solvent such as acetone, trichloroethane (1,1,2-trichloroethane), and the like. Another method utilizes mechanical cleaning such as buffing or grinding which generally abrades the surface.

Generally, any conventional corona discharge equipment can be utilized in the present invention. Such types of corona discharge equipment are known to those skilled in the art and to the literature and, hence, will not be described in detail. Corona discharge equipment has electrodes and the shape and sizes as well as the relative positions of the electrodes can be varied according to specific requirements of the substrate. It is desirable to use a dielectric buffer in order to promote a diffuse and uniform discharge and is sometimes desirable to also use a spacer located between the upper electrode and the surface of the dielectric elastomer in order to insure a uniform gap which contains the discharge atmosphere. It is also desirable that the substrate surface and the electrodes be positioned such that a relatively uniform discharge over the desired area of treatment can be assured. The corona discharge equipment preferably can be run in air, or in other atmospheres, including nitrogen, ammonia, and argon.

The surface of the highly saturated elastomer layer is activated by a corona discharge under atmospheric conditions. Highly saturated hydrocarbon elastomers generally have inherently low surface energies. The corona discharge treatment generates polar functions on the surface of the elastomer as the surface is bombarded with electrons and gases such as ozone, nitrogen and oxygen. These polar functions contribute to increased surface energy and increased surface tension to improve the wettability of the elastomer surface. Wettability is observed qualitatively as the spreading of a high surface tension liquid such as water on the surface of a substrate. Generally, a level of corona discharge is utilized which produces a surface which is wettable by water when test areas or test samples are contacted with water. The amount of corona discharge generally varies with the wattage of the discharge, with time, and is also dependent upon the type of substrate or layer, the thickness and the dielectric constant of the substrate. The size of the gap of air or type of atmosphere can vary the voltage requirement for corona discharge. The time application of the corona discharge can generally vary from about 0.1 sec. to about 1 min. Typically, the amount of time varies inversely with the wattage of the corona discharge. The key requirement is that an effective amount of corona discharge is applied to the surface of the substrate to achieve improved wettability. That is, when a high surface tension liquid such as water is applied to the surface, it generally covers at least 25 percent, desirably at least 50 percent, more desirably at least 75 percent, and preferably at least 90 percent or 100 percent of the activated area. Thus, when the high surface tension liquid covers the entire activated surface, there is no beading of the liquid on the surface of the substrate. Although water is utilized as a standard reference, it is to be understood that the halogenating agent is actually applied to the activated surface.

The surface of the elastomer can generally reconstruct or restore itself within 15 minutes of the corona discharge treatment. Reconstruction of the polymer surface presumably occurs by diffusion of the polar functional groups from the elastomer surface into the bulk of the elastomer. To prevent reconstruction, the activated surface of the elastomer is chemically fixed or frozen by immediately applying and treating the activated surface with halogenating agents. The lapse time between the corona discharge treatment and the halogenating agent application is generally as short as possible and thus is within 15 minutes, desirably within 5 minutes, and preferably within 3 minutes.

Suitable halogenating agents can be aqueous chlorine and bromine solutions and acidified hypochlorite solutions. Desired halogenating agents include the various N-halohydantoins, the various N-haloimides, and the various N-haloamides. Examples of various N-halohydantoins include 1,3-dichloro-5,5-dimethyl hydantoin; 1,3-dibromo-5,5-dimethyl hydantoin; 1,3-dichloro-5-methyl-5-isobutyl hydantoin; and 1,3-dichloro-5-methyl-5-hexyl hydantoin. Examples of N-haloamides include N-bromoacetamide and tetrachloroglycoluril. Examples of N-haloimides include N-bromosuccinimide and the various chloro substituted s-triazinetriones, commonly known as mono-, di-, and trichloroisocyanuric acid. A preferred treating composition for use in the practice of the present invention are the various mono-, di-, or trichloroisocyanuric acids, or combinations thereof. Trichloroisocyanuric acid is especially preferred.

The halogenating agents usually exist in solid form. Accordingly, various solvents are utilized having boiling points below approximately 140° C. such as various esters wherein the acid portion has from 1 to 5 carbon atoms and the ester portion has from 1 to 5 carbon atoms. Examples include methyl acetate, ethyl propionate, butyl acetate, ethyl acetate, and the like, as well as mixtures thereof. Other solvents can be utilized such as various ethers, various ketones, and the like. Solubility of the halogenating agent is important in order that the halogenating agent substantially or completely wet-out the activated surface of the elastomer. Solvents which react with the halogenating agents such as toluene should be avoided. Typically a small amount of the halogenating agent exists in the solvent as, for example, generally up to 6 percent based on the weight of the solvent, and preferably from about 1.0 percent to about 3 percent by weight.

Application of the halogenating agent generally occurs at ambient temperature, that is from about 10° C. to about 50° C., although the surface of the substrate may be at a considerably higher temperature due to the discharge and other processes. Any conventional application can be utilized such as brushing, dipping, rolling, and the like. The amount applied is such that the surface of the elastomer is substantially wetted out and preferably completely wetted out. Preferably two or more coats of the halogenating agent is applied to insure that all the elastomer surface is wetted out. The solvent system typically dries in air within a matter of minutes, or may be evaporated more quickly by heating and/or forcing air or other gas over the surface.

Coatings adhered to the elastomer include conventional protective coatings known to the art and to the literature such as various epoxies, various polyurethanes, various acrylates, various elastomers, and the like. Such coatings are generally decorative in nature and thus often can be paints containing pigments therein. The coating may also have protective utility. The epoxy coating can be any conventional epoxy such as a difunctional epoxy resin, a trifunctional epoxy resin, a polyfunctional epoxy resin, and the like, and are characterized by containing an epoxy or oxirane group therein. The urethanes can be made in any conventional manner and thus can be made from an ether intermediate such as an oxyethylene or an oxypropylene, a butylene oxide (THF), or a lactone intermediate such as caprolactone or a polyester. Similarly, the acrylates can be in the form of a soft acrylate polymer or copolymer thereof. Various adhesives including so-called rubber-based adhesives and acrylate-based adhesives can also be utilized. The elastomer coating can be in the form of a thick substrate such that a laminate or composite is formed. Such elastomers can be the same as set forth hereinabove with regard to the substrate containing an activated surface thereon except that they need not be highly saturated and examples of the same include polybutadiene, polyisoprene, styrene-butadiene rubber, EPM, EPDM, and the like. If a cured substrate, such as a lap seal on roofing material, is to be adhered, then preferably both substrates should be treated with the corona discharge and halogenating agents.

Inasmuch as the halogenating agents chemically fix the highly saturated elastomer substrate, such substrates can be stored for long periods of time before any coating is applied thereto. If stored, the halogen treated highly saturated elastomer substrate is cleaned as by brushing to remove any dust or dirt, as by wiping with a solvent, or the like. Optionally, the surface can be freshened by giving another treatment with the halogenating agent prior to bonding, if the substrate is to be stored for an extended period.

The present invention can be utilized in any application wherein it is desirable to bond or adhere a coating to a highly saturated elastomer. A composite or lamina of the highly saturated elastomer, the halogenating agent, and the coating, is thus formed. In the manufacture of articles from highly saturated elastomers, such as roofing materials, it is frequently desirable to apply a coating of paint. An advantage of a paint coating is that it can have reflective properties which would lessen the amount of heat absorbed through the roofing materials into the roofing structure, and it may also be desirable from a decorative viewpoint. Specific end uses of the composites or lamina of the present invention include the adhesion of polyurethane paint to flexible elastomers such as EPDM or EPM roofing materials, the application of an epoxy or urethane or other adhesive to a lap joint of an elastomeric roofing membrane, the application of an epoxy or urethane or other paint to a tire sidewall, the bonding of a highly saturated elastomeric substrate to another substrate through an adhesive based on an epoxy, urethane, acrylate, nitrile, butyl, or EPDM rubber, and the like.

The coatings may be applied by any conventional technique such as brushing, spraying, rolling, dipping, tampon, silk-screen, printing, transfer, etc.

The coatings are generally cured in any conventional manner as through solvent evaporation, heating, and the like. The adhesives may be used as pressure-sensitive, contact, hot-melt, curable, etc. systems.

The invention will be better understood by reference to the following examples.

EXAMPLES 1 through 6

Fabric-back plaques were prepared from ethylene-propylene-diene monomers (EPDM) utilizing the following ingredients. The mixture was cured for 40 minutes at 160° C.

| Ingredients | PHR | Wt. (grams) |
| --- | --- | --- |
| Royalene 512 (EPDM) | 100 | 741.9 |
| HAF Black | 60 | 445.1 |
| TE 70 Processing Aid | 1.5 | 11.1 |
| Agerite Resin D | 2.0 | 14.8 |
| Zinc Oxide | 5.0 | 37.1 |
| Vulkup 40 KE | 7.5 | 55.6 |
| TOTAL | 176.0 | 1305.6 grams |

The plaques were each 6 inches x 6 inches x 0.100 inches in size and contained calendered rubber/fabric backing to prevent distortions upon testing. The surfaces of the plaques were each cleaned by rubbing vigorously four times with acetone-soaked cheesecloth. Each plaque was dried and then treated as indicated below.

EXAMPLE 1

No treatment.

EXAMPLE 2

A 2 percent solution of trichloroisocyanuric acid (TCTT) in ethyl acetate was brushed on the surface of the plaque. Two coats were applied. The second coat was applied at an angle other than parallel to the first coat such that the surface was wetted out.

EXAMPLE 3

Corona discharge for 20 seconds at 4 amps and 60 volts in air was directed at the surface of the plaque. The corona discharge apparatus used a glass buffered upper electrode made from a stainless steel wire screen, 6 inches×6 inches. The elastomer was separated from the upper electrode buffer by a 7 inch×7 inch outer diameter, 5 inch×5 inch inner diameter, 0.060 inch thick polyethylene "picture frame" spacer. Immediately following the corona discharge, the surface was treated with two coats of a 2 percent solution of TCTT in the same manner as Example 2.

EXAMPLE 4

The plaque surface was treated in the same manner as Example 3 followed by a surface wash with a 40 percent solution of ethanol in water followed by absolute ethanol.

EXAMPLE 5

The plaque surface was treated in the same manner as Example 3 except that no TCTT was applied.

EXAMPLE 6

The plaque surface was treated in the same manner as Example 5 with a 20 minute wait before the paint was applied.

An aliphatic moisture curable polyester type polyurethane paint was applied to each of Examples 1 through 6 in the following manner. The paint was mixed vigorously with about 1 percent tin octoate-based catalyst for about 2 minutes. It was allowed to stand briefly to allow air bubbles to escape. A heavy coat of the freshly catalyzed polyurethane paint was applied. In Example 5, the paint was brushed on immediately after corona discharge treatment, that is within 2 minutes. In Example 6, the paint was brushed on 20 minutes after the corona discharge treatment. Each sample was allowed to dry in air at room temperature for about 20 minutes. Each was then covered with a light-cotton polyester fabric. Pressure was applied to each fabric after this coating. Ten minutes later, a second coat of polyurethane paint was applied and the pads were air dried for two hours at room temperature, before curing for 30 minutes at 100° C. Several days later, the pads were cut into 1 inch strips for the 180° peel adhesion test. This test measures adhesion forces utilizing an Instron test apparatus (peel rate 1 inch per minute, ambient temperature).

TABLE I

| 180° Peel Test of Fabric-Reinforced Polyurethane Coatings at Room Temperature | | |
| --- | --- | --- |
| EXS. | PEEL ADHESION STRENGTH | BEHAVIOR |
| 1 | 0.9 | Interfacial Failure |
| 2 | 1.8 | Interfacial Failure |
| 3 | 9.0 | Cohesive Failure in Coating |
| 4 | 9.2 | Cohesive Failure in Coating |
| 5 | 0.7 | Interfacial Failure |
| 6 | 0.8 | Interfacial Failure |

EXAMPLES 7 through 11

In this set of Examples, a blend of chlorobutyl and natural rubber (70:30 wt/wt) made up 55 percent of the elastomer, and fillers and curatives, such as carbon black, zinc oxide, processing oils, made up 45 percent of the elastomer. A polyurethane paint was applied.

| EX. | TREATMENT | PEEL STRENGTH AT ROOM TEMP. | BEHAVIOR |
|---|---|---|---|
| 7 | None | 0.4 | Interfacial Failure |
| 8 | 2% TCTT in Ethyl Acetate | 20.0 | Tear at Fabric |
| 9 | Corona Discharge, 10 secs., 6 amps, 2% TCTT in Ethyl Acetate | 18.1 | Mixed Failure: Elastomer Tear, Fabric Break, Cohesion Coating Failure |
| 10 | Corona Discharge, 10 secs., 6 amps, coating immed. after discharge | 4.8 | Clean Interfacial Failure |
| 11 | Corona Discharge, 10 secs., 6 amps, coating 10 mins. after discharge | 3.4 | Clean Interfacial Failure |

Discussion

The peel test results for Examples 1 through 6 indicate that the corona discharge treatment alone caused no improvement in the bonding strength in the coating to EPDM, Examples 5 and 6. The peel test results indicate that the TCTT treatment alone resulted in a small improvement in bonding strength to the EPDM, Example 2. However, where the corona discharge treatment was combined with the TCTT treatment, not only a strong adherent coating but also a synergistic bond resulted, Examples 3 and 4.

An examination of the results from Examples 8 and 9 in which the elastomer was unsaturated (NR) indicates the lack of importance of the corona discharge treatment in combination with TCTT with this type of substrate. Treating unsaturated elastomers with only TCTT resulted in adherent bonds. Thus the treatment of highly saturated elastomers with both corona discharge and TCTT demonstrates unexpected results as shown in Examples 3 and 4.

While in accordance with the Patent Statutes, the best mode and preferred embodiment has been set forth, the scope of the invention is not limited thereto, but rather by the scope of the attached claims.

What is claimed is:

1. A process for activating a highly saturated elastomer surface, comprising:
   exposing a surface of a highly saturated elastomer to an effective amount of a corona discharge to activate said elastomer surface, said highly saturated elastomer being less than 20 mole percent unsaturated, and
   immediately thereafter applying a halogenating agent to said activated elastomer surface at an effective concentration to chemically fix said activated surface.

2. A process according to claim 1, wherein said highly saturated elastomer is a homopolymer, a copolymer, or a terpolymer having at least 80 mole percent saturation made from a conjugated diene having from 4 to 12 carbon atoms, a halogenated diene having from 4 to 12 carbon atoms, a vinyl substituted aromatic having from 8 to 12 carbon atoms, an alkylene having from 2 to 10 carbon atoms, or combinations thereof.

3. A process according to claim 2, wherein said effective amount of corona discharge provides at least a 25 percent wetout of water on said corona-treated surface.

4. A process according to claim 3, including applying said halogenating agent within 15 minutes of said corona discharge treatment, and wherein said halogenating agent is a N-halohydantoin, a N-haloamide, a N-haloimide, an aqueous chlorine solution, an aqueous bromine solution, an acidified hypochlorite solution, or combinations thereof.

5. A process according to claim 4, wherein said halogenating agent is applied within 5 minutes after said corona discharge treatment, wherein said halogenating agent is said N-halohydantoin, said N-haloamide, said N-haloimide, or combinations thereof, and wherein said effective amount of corona discharge provides at least 50 percent wetout of water on said corona-treated surface.

6. A process according to claim 5, including applying a coating to said chemically fixed surface, and wherein said effective amount of corona discharge provides at least 75 percent wetout of water on said corona-treated surface.

7. A process according to claim 6, wherein said halogenating agent is 1,3-dichloro-5,5-dimethyl hydantoin, 1,3-dichloro-5-isobutyl hydantoin, 1,3-dichloro-5-methyl-5-hexyl hydantoin, N-bromoacetamide, tetrachloroglycoluril, N-bromosuccinimide, mono-, di-, or trichloroisocyanuric acid, or combinations thereof, and wherein said effective amount of corona discharge provides at least 90 percent wetout of water on said corona-treated surface.

8. A process according to claim 7, wherein said application of said halogenating agent is within 3 minutes of said corona discharge treatment.

9. A process according to claim 8, wherein said highly saturated elastomer is made from butadiene, isoprene, styrene and butadiene monomers, ethylene-propylene monomers, ethylene-propylene-diene monomers, or combinations thereof and has at least 90 mole percent saturation.

* * * * *